(12) United States Patent
Kweon et al.

(10) Patent No.: US 11,062,470 B2
(45) Date of Patent: Jul. 13, 2021

(54) APPARATUS AND METHOD FOR DEPTH ESTIMATION BASED ON THERMAL IMAGE, AND NEURAL NETWORK LEARNING METHOD THEREFOF

(71) Applicant: KOREA ADVANCED INSTITUTE OF SCIENCE AND TECHNOLOGY, Daejeon (KR)

(72) Inventors: In-So Kweon, Daejeon (KR); Yukyung Choi, Daejeon (KR); Nam Il Kim, Daejeon (KR); Soonmin Hwang, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 92 days.

(21) Appl. No.: 16/487,557

(22) PCT Filed: Aug. 24, 2017

(86) PCT No.: PCT/KR2017/009273
§ 371 (c)(1),
(2) Date: Aug. 21, 2019

(87) PCT Pub. No.: WO2018/155777
PCT Pub. Date: Aug. 30, 2018

(65) Prior Publication Data
US 2019/0385325 A1    Dec. 19, 2019

(30) Foreign Application Priority Data

Feb. 22, 2017    (KR) ........................ 10-2017-0023475

(51) Int. Cl.
*G06T 7/593*    (2017.01)
*G06N 3/08*    (2006.01)
*G06T 3/40*    (2006.01)

(52) U.S. Cl.
CPC ............. *G06T 7/593* (2017.01); *G06N 3/088* (2013.01); *G06T 3/4007* (2013.01);
(Continued)

(58) Field of Classification Search
CPC combination set(s) only.
See application file for complete search history.

(56) References Cited

U.S. PATENT DOCUMENTS 5,313,532 A * 5/1994 Harvey .................... G06K 9/32
382/133
9,275,078 B2   3/2016 Bhardwaj et al.
(Continued)

FOREIGN PATENT DOCUMENTS

KR    10-0938195    1/2010
KR    10-1012691    2/2011
(Continued)

OTHER PUBLICATIONS

Jure Zbontar et al., Stereo matching by training a convolutional neural network to compare image patches, Journal of Machine Learning Research 17 (2016) 1-32, Apr. 2016.
(Continued)

*Primary Examiner* — Tsung Yin Tsai
(74) *Attorney, Agent, or Firm* — Lex IP Meister, PLLC

(57) ABSTRACT

A depth estimating apparatus operated by at least one processor includes: a database which stores a photographed first color image, a training thermal image geometrically aligned with the first color image, and a second color image simultaneously photographed with the first color image as a training image set; and a training apparatus which trains a neural network in an unsupervised manner to output a chromaticity image and a binocular disparity image from the training thermal image. The training apparatus generates an estimated first color image from the second color image, the
(Continued)

chromaticity image, and the binocular disparity image, and trains the neural network to minimize a difference between the estimated first color image and the photographed first color image.

20 Claims, 11 Drawing Sheets

(52) U.S. Cl.
 CPC ............... *G06T 2207/10024* (2013.01); *G06T 2207/10048* (2013.01); *G06T 2207/20081* (2013.01); *G06T 2207/20084* (2013.01)

(56) References Cited

U.S. PATENT DOCUMENTS

| | | | |
|---|---|---|---|
| 9,813,693 B1* | 11/2017 | Baldwin | H04N 13/239 |
| 2010/0141757 A1 | 6/2010 | Baik et al. | |
| 2011/0096832 A1 | 4/2011 | Zhang et al. | |
| 2012/0163703 A1* | 6/2012 | Lim | G06T 7/593 |
| | | | 382/154 |
| 2013/0106837 A1 | 5/2013 | Mukherjee et al. | |
| 2017/0041585 A1* | 2/2017 | Liu | G06T 5/005 |
| 2018/0124371 A1* | 5/2018 | Kamal | H04N 13/271 |
| 2020/0090359 A1* | 3/2020 | Pillai | G06T 7/50 |
| 2020/0146557 A1* | 5/2020 | Cheung | G06K 9/2018 |

FOREIGN PATENT DOCUMENTS

| | | |
|---|---|---|
| KR | 10-1310923 | 9/2013 |
| KR | 10-2016-0086802 | 7/2016 |

OTHER PUBLICATIONS

Hicham Halloua et al., An intelligent method using neural networks for Depth detection by standard thermal contrast in active thermography, 2016 Quantitative InfraRed Thermography, pp. 697-704, Jan. 2016.
David Eigen et al., Depth Map Prediction from a Single Image using a Multi-Scale Deep Network, In Advances in Neural Information Processing Systems (NIPS), Jun. 2014.
Fayao Liu et al., Deep Convolutional Neural Fields for Depth Estimation from a Single Image, In Proceedings of IEEE Conference on Computer Vision and Pattern Recognition (CVPR), , pp. 5162-5170, Jun. 2015.
Ravi Garg et al., Unsupervised CNN for Single View Depth Estimation: Geometry to the rescue, In Proceedings of European Conference on Computer Vision (ECCV), Jul. 29, 2016.
Yukung Choi et al., All-Day Visual Place Recognition: Benchmark Dataset and Baseline, In Proceedings of IEEE Conference on Computer Vision and Pattern Recognition workshops (CVPRw), Jun. 2015.
Yukyung Choi et al., Thermal Image Enhancement using Convolution Neural Network, The IEEE/RSJ International Conference on Intelligent Robots and Systems (IROS), pp. 223-230, Oct. 2016.
Anonymous CVPR submission, Multispectral Transfer Network: Unsupervised Depth Estimation for All-day Vision, CVPR 2017 Submission #592 Confidential Review, 2017.
Anonymous CVPR submission, Supplementary Material for Submission Multispectral Transfer Network: Unsupervised Depth Estimation for All-day Vision, CVPR 2017 Submission #592 Confidential Review, 2017.

* cited by examiner (a) Example of thermal image obtained at different times (b) Thermal images generated by photometrically correcting specific thermal image (a)

(b)

APPARATUS AND METHOD FOR DEPTH ESTIMATION BASED ON THERMAL IMAGE, AND NEURAL NETWORK LEARNING METHOD THEREFOF

TECHNICAL FIELD

The present disclosure relates to depth estimation.

BACKGROUND ART

A conventional image based depth estimating method is generally performed through supervised learning. Thesis 1 (Depth Map Prediction from a Single Image using a Multi-Scale Deep Network, In Advances in Neural Information Processing Systems (NIPS), 2014) represents a method for directly regressing a color image to a depth image by using deep learning, and a learning model is configured with two coarse and fine networks, an outline of entire depth information is obtained through the coarse scale network, and details of local depth information are added through the fine scale network. Thesis 2 (Deep Convolutional Neural Fields for Depth Estimation from a Single Image, in Proceedings of IEEE Conference on Computer Vision and Pattern Recognition (CVPR), 2015) proposes a log-likelihood method for estimating depth information using a conditional random field, and allows learning through a neural network.

Recently, in order to overcome generation of high-quality actually-measured verified images (Ground truth) for supervised learning, unsupervised learning using geometric restriction of a stereo camera image has been researched. For example, Thesis 3 (Unsupervised CNN for Single View Depth Estimation: Geometry to the rescue, In Proceedings of European Conference on Computer Vision (ECCV), 2016) uses a stereo-type binocular image in the case of learning so as to generate depth information. That is, a left image is used as an input of a learning network, a binocular disparity map on a pixel level is estimated, and the left image is transformed into the binocular disparity map to generate a right image. An entire architecture is learned by using the generated right image and a brightness value of the pixel level of the original right image. However, Thesis 3 has to sequentially add a learning layer and learn the same for stable convergence of the network for estimating the binocular disparity map, so it is difficult for it to be referred to as a perfect learning model (end-to-end model).

In another way, the conventional studies including Thesis 1 to Thesis 3 are depth Photometric correction estimating methods using visible ray images, so they have a fundamental restriction that it is difficult to acquire depth information in an environment in which there is a steep change of lighting or a night environment in which an amount of light is insufficient. Therefore, apparatuses such as vehicles or robots requiring acquisition of depth information irrespective of day or night have to use a plurality of radar or lidar sensors even though they are expensive and are difficult to install. Particularly, autonomous cars or disaster relief robots that are being actively researched have recently had expensive 3D laser sensors installed so as to robustly recognize objects and environments, and substitute techniques are required so as to increase feasibility thereof.

DISCLOSURE

Technical Problem

The present disclosure provides a depth estimating apparatus using a thermal image that is robust in a change of lighting and is photographed regardless of day or night. The present disclosure provides a method for training a neural network for outputting a chromaticity image (Chromaticity) and a binocular disparity image (Disparity) in an unsupervised manner by using a color image and a thermal image. The present disclosure provides a method for generating a depth image (Depth map) based on a binocular disparity image that is output by inputting a single thermal image to the trained neural network.

Technical Solution

An exemplary embodiment of the present disclosure provides a depth estimating apparatus operated by at least one processor. The depth estimating apparatus includes: a database which stores a photographed first color image, a training thermal image geometrically aligned with the first color image, and a second color image simultaneously photographed with the first color image as a training image set; and a training apparatus which trains a neural network in an unsupervised manner to output a chromaticity image and a binocular disparity image from the training thermal image. The training apparatus generates an estimated first color image from the second color image, the chromaticity image, and the binocular disparity image. And the training apparatus trains the neural network to minimize a difference between the estimated first color image and the photographed first color image.

The training apparatus may estimate a luminance component of the estimated first color image from a luminance component of the second color image based on the binocular disparity image, and may combine the estimated luminance component and the chromaticity image to generate the estimated first color image.

The database may further store a plurality of thermal images obtained by performing a photometric correction on the training thermal image. And the training apparatus may train the neural network by using the photometrically corrected thermal images.

The depth estimating apparatus may further comprising an output apparatus which receives a single thermal image for estimating a depth, sends the single thermal image to the neural network to obtain a binocular disparity image for depth estimation, and generates a depth image based on the binocular disparity image for depth estimation.

The neural network may include: an encoder for encoding features of an input thermal image; an interleaver for receiving encoded information and intermediate information of the encoder from the encoder, and outputting the chromaticity image; and a decoder for receiving encoded information and intermediate information of the encoder from the encoder and outputting the binocular disparity image.

Another embodiment of the present disclosure provides a depth estimating apparatus operated by at least one processor. The depth estimating apparatus includes: a trained neural network to output a binocular disparity image from a thermal image; and an output apparatus which receives a single thermal image for estimating a depth, sends the single thermal image to the neural network to obtain a binocular disparity image for depth estimation, and generates a depth image based on the binocular disparity image for depth estimation.

The neural network may include: an encoder for encoding features of an input thermal image; an interleaver for receiving encoded information and intermediate information of the encoder from the encoder, and outputting a chromaticity image; and a decoder for receiving encoded information and intermediate information of the encoder from the encoder, and outputting a binocular disparity image relating to the input image.

The depth estimating apparatus may further comprising a training apparatus which trains the neural network in an unsupervised manner by using a training image set including a photographed first color image, a training thermal image geometrically aligned with the first color image, and a second color image simultaneously photographed with the first color image. The training apparatus may inputs the training thermal image to the neural network to obtain a training chromaticity image and a training binocular disparity image, may train the neural network to generate an estimated first color image from the second color image, the chromaticity image, and the binocular disparity image, and minimize a difference between the estimated first color image and the photographed first color image.

The decoder may include a bilinear interpolation sampler to output a binocular disparity image to an output end.

The decoder may further include an adaptive activation function module for gradually increasing a maximum value of an activation function so as to stably train the bilinear interpolation sampler.

The output apparatus may receive the single thermal image from a thermal camera mounted on a mobility object.

Yet another embodiment of the present disclosure provides a neural network operated by at least one processor. The neural network includes: an encoder which receives a thermal image, outputs feature information of the thermal image encoded through a plurality of convolution layers hierarchically connected to each other, and outputs intermediate information encoded in respective convolution layers; a decoder which includes a plurality of deconvolution layers hierarchically connected to each other, receives the feature information of the thermal image output from the encoder and the intermediate information output from the respective convolution layers of the encoder, and outputs a binocular disparity image relating to the thermal image; and an interleaver which includes a plurality of interleaving layers hierarchically connected to each other, receives the feature information of the thermal image output from the encoder and the intermediate information output from the respective convolution layers of the encoder, and outputs a chromaticity image relating to the thermal image.

The respective interleaving layers may generate global context information by global pooling and un-pooling the intermediate information output from the corresponding convolution layer of the encoder, may add the generated global context information to previous information transmitted from an upper interleaving layer to generate new information, and may transmit new information deconvolved to a lower interleaving layer. The previous information may be generated by adding global context information generated in the upper interleaving layer and information encoded in the encoder.

The decoder may further include a bilinear interpolation sampler which outputs the binocular disparity image from decoded information output in a lowest deconvolution layer, by bilinear interpolation sampling.

The decoder may further include an adaptive activation function module for gradually increasing a maximum value of an activation function so as to stably train the bilinear interpolation sampler.

The neural network may learn to minimize a difference between an estimated first color image and a photographed first color image. The estimated first color image may be obtained from the second color image, the binocular disparity image, and the chromaticity image. The photographed first color image may be geometrically aligned with the thermal image. And the photographed first color image and the second color image may be simultaneously photographed.

Yet another embodiment of the present disclosure provides an operating method of a depth estimating apparatus operable by at least one processor. The operating method includes: obtaining a chromaticity image and a binocular disparity image by inputting a training thermal image to a neural network; estimating a second color image from a first color image by using the chromaticity image and the binocular disparity image; and training the neural network to minimize the difference between the estimated second color image and the photographed second color image. The training thermal image and the photographed second color image are geometrically aligned. The first color image and the photographed second color image are stereo images that are simultaneously photographed.

The estimating the second color image includes: estimating a luminance component of the estimated second color image from a luminance component of the first color image by using the binocular disparity image; and generating the estimated the second color image by combining the estimated luminance component and the chromaticity image.

The training thermal image may be generated by a photometric correction on a photographed specific thermal image.

The operating method may further comprising: receiving a single thermal image for depth estimation; transmitting the single thermal image to the neural network and obtaining a binocular disparity image for depth estimation; and generating a depth image based on the binocular disparity image for depth estimation.

Advantageous Effects

According to the exemplary embodiment of the present disclosure, the depth (distance) may be estimated through the thermal camera and the trained neural network, instead of the hardware sensor such as a plurality of radar or lidar sensors that are expensive and are hard to install, in the environments in which lighting is changed or at night in which the amount of light is insufficient.

According to the exemplary embodiment of the present disclosure, the depth estimation from a single thermal image may consecutively improve accuracy as the neural network is continuously trained.

According to an exemplary embodiment of the present disclosure, the thermal image based depth estimating method may be substituted for the present depth estimating hardware sensor. Particularly, according to an exemplary embodiment of the present disclosure, an autonomous vehicle or a disaster relief robot may be allowed to robustly recognize objects and environments, and performance thereof may be improved through software without replacing parts.

MODE FOR INVENTION

Figure 1:
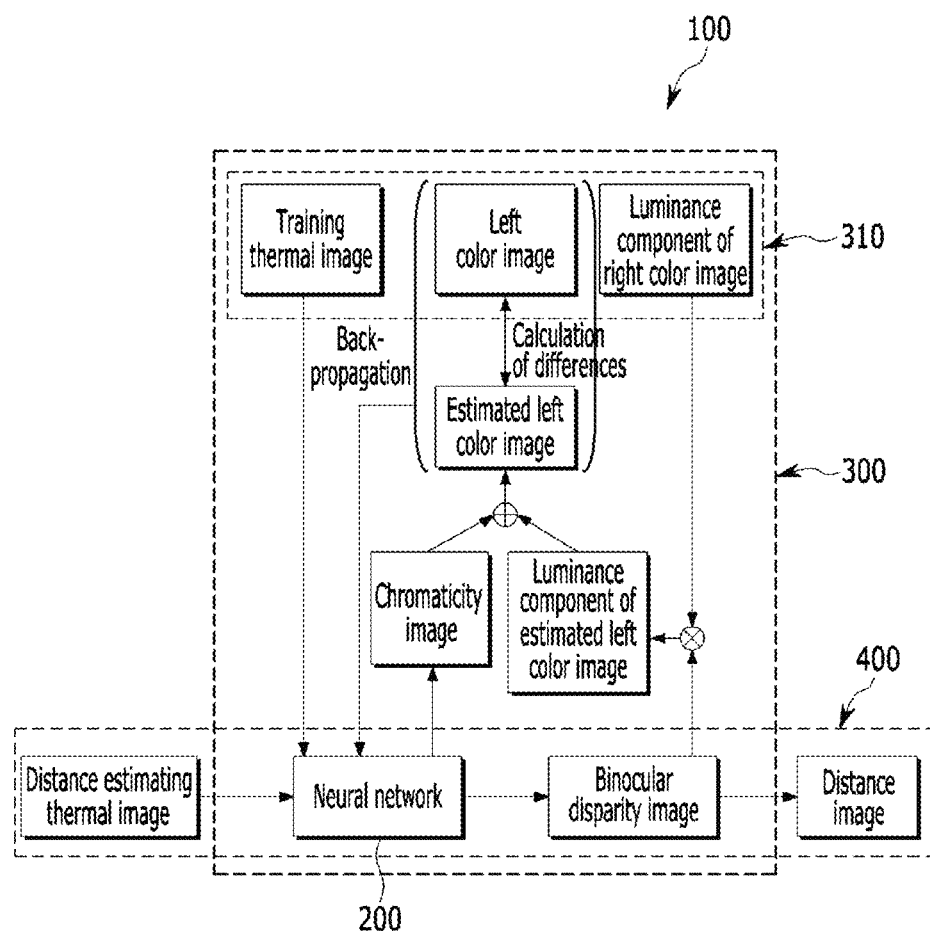
FIG. 1 shows a schematic diagram of a thermal image based depth estimating apparatus according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 2:
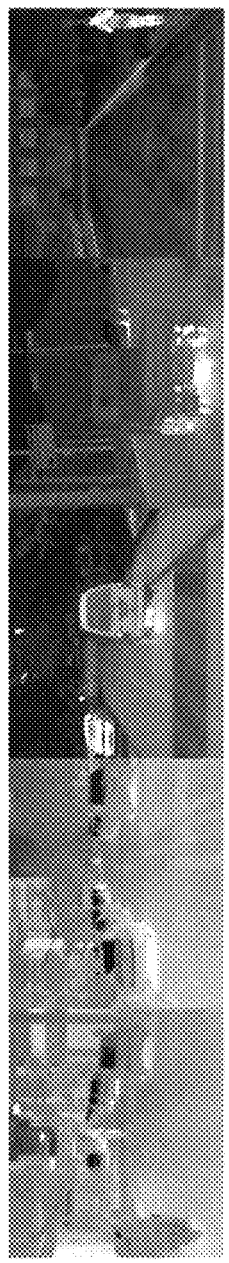
FIG. 2 shows a photometric correction of a thermal image according to an exemplary embodiment of the present disclosure.
Figure 2:
Figure 3:
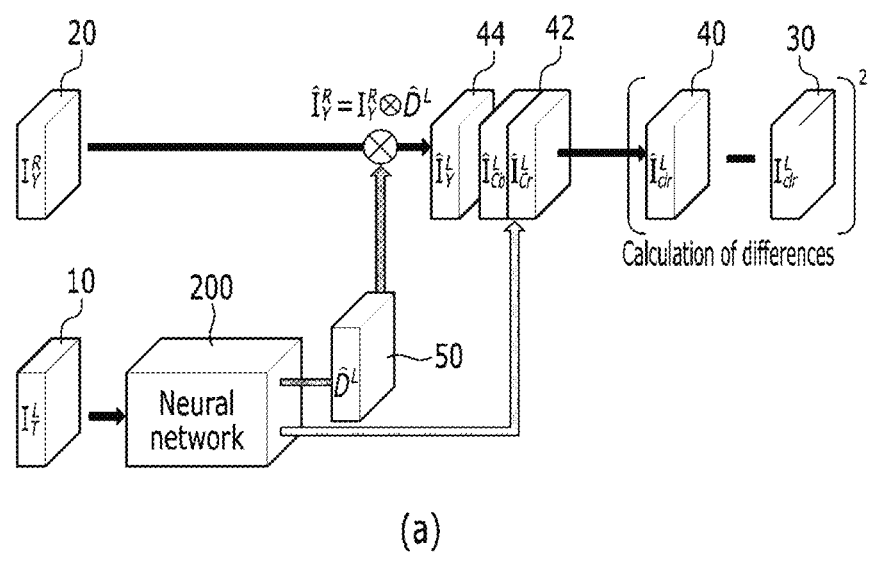
FIG. 3 shows an operation of a thermal image based depth estimating apparatus according to an exemplary embodiment of the present disclosure.
Figure 3:
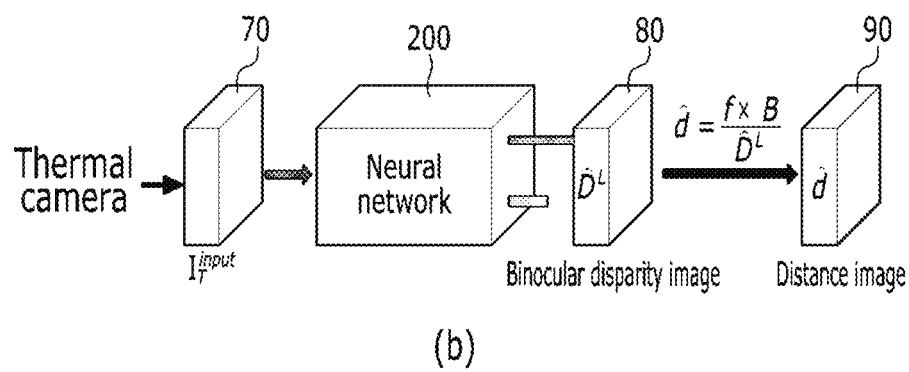

FIG. 1 shows a schematic diagram of a thermal image based depth estimating apparatus according to an exemplary embodiment of the present disclosure, FIG. 2 shows a photometric correction of a thermal image according to an exemplary embodiment of the present disclosure, and FIG. 3 shows an operation of a thermal image based depth estimating apparatus according to an exemplary embodiment of the present disclosure.

Referring to FIG. 1, the thermal image based depth estimating apparatus (hereinafter, depth estimating apparatus) 100 includes a training apparatus 300 operable by at least one processor and training a neural network 200, and a depth image outputting apparatus 400 for outputting a depth image from a single thermal image by using the neural network 200. The training apparatus 300 and the depth image outputting apparatus 400 may be combined, or the training apparatus 300 may be separated from the depth image outputting apparatus 400, and for ease of description, they will be assumed to be combined with the depth estimating apparatus 100.

When the training apparatus 300 is separated from the depth image outputting apparatus 400, the training apparatus 300 may train the neural network 200 in the center, and a plurality of depth image outputting apparatuses 400 may use the trained neural network 200. When the neural network 200 is updated in the training apparatus 300, a plurality of depth image outputting apparatuses 400 may download the updated neural network 200 and may use the same. For example, a mobility object such as a vehicle or a robot may have the depth image outputting apparatus 400 mounted thereto, and the neural network 200 trained by the training apparatus 300 may be periodically updated.

In another way, the depth estimating apparatus 100 and a thermal camera (not shown) may be realized to be integral or separate, and for ease of description, the depth estimating apparatus 100 and the thermal camera will be assumed to be separate.

A model of the neural network 200 may not be specified, but for ease of description, it will be assumed to be convolution neural network (CNN). The neural network 200 may be referred to as a multispectral transfer network (MTN) as it is produced by transfer learning from the color image to the thermal image. The neural network 200 includes an encoder for encoding features of an image input, an interleaver for receiving encoded information and intermediate information of the encoder and outputting a chromaticity image (Chromaticity) image, and a decoder for receiving encoded information and intermediate information of the encoder and outputting a binocular disparity image (Disparity). The neural network 200 transforms a thermal image into a binocular disparity image through encoding and decoding. Particularly, the neural network 200 is designed to simultaneously estimate the chromaticity image (Chromaticity) of the color image which is geometrically aligned with thermal image in the interleaver in the case of training. Therefor it is possible to estimate more accurate binocular disparity. In the case of the training of the neural network 200, a weight for optimizing the encoder or a gradient of the weight are influenced by the decoder and the interleaver and are then updated. As a result, intermediate layers of the encoder support a binocular disparity map estimation and a chromaticity estimation to be efficiently processed.

An architecture of the neural network 200 will be described in detail with reference to FIG. 4 to FIG. 6.

The training apparatus 300 trains the neural network 200 in an unsupervised manner to output a chromaticity image (Chromaticity) and a binocular disparity image (Disparity) from training image sets. The training image sets may be stored in a training image database 310.

One training image set includes a thermal image and a color stereo image corresponding to the thermal image. The color stereo image includes a left color image and a right color image. The color image may be a YCbCr image. The thermal image is geometrically aligned with one of the left color image and the right color image. For ease of description, the left color image ($I_{clr}^L$) will be assumed to be a reference image geometrically aligned with the thermal image, and it may be used as an actual measurement verifying image (Ground truth) in the neural network training. The thermal image geometrically aligned with the left color image ($I_{clr}^L$) will be referred to as a left thermal image ($I_T^L$), or simply a thermal image. There may be various methods for obtaining training images, and for example, different types of thermal images and color images may be geometrically aligned by using a beam splitter, and the training images may be obtained.

Referring to FIG. 2 (a), an entire brightness value of the thermal image from among the training images varies because of temperature differences with respect to time. To solve this problem, the training apparatus 300 augments a specific thermal image to a plurality of thermal images through photometric correction. The training apparatus 300 may train the neural network 200 that is robust in the change of brightness by inputting the augmented thermal images to the neural network 200.

The photometric correction may apply correction parameters (λ, γ) to the training image by using a gamma correction equation such as Equation 1. Referring to FIG. 2 (b), the thermal image (original) photographed at a specific time is transformed into thermal images with various time frames, and these images may be used in the neural network training.

$$P_{cor}(x) = \lambda x^\gamma \qquad \text{(Equation 1)}$$

A detailed training method of the training apparatus 300 is as follows.

Referring to FIG. 3 (a), the training apparatus 300 estimates a left color image ($\hat{I}_{clr}^L$) 40 based on luminance (Y-Channel) components ($I_Y^R$) 20 of a right color image and a thermal image ($I_L^T$) 10. The training apparatus 300 trains the neural network 200 by back-propagation so as to minimize a difference ($\hat{I}_{clr}^L - I_{clr}^L$) between the estimated left color image ($\hat{I}_{clr}^L$) 40 and a photographed left color image ($I_{clr}^L$) 30.

A method for obtaining the estimated left color image ($\hat{I}_{clr}^L$) is as follows.

First, the training apparatus 300 generates a chromaticity image ($\hat{I}_{cb}^L, \hat{I}_{cr}^L$) 42 of the left color image and a binocular disparity image ($\hat{D}^L$) 50 by inputting the thermal image ($I_T^L$) 10 to the neural network 200. The thermal image ($I_T^L$) 10 is geometrically aligned with the left color image.

The training apparatus 300 transforms the luminance (Y-Channel) component ($I_Y^R$) 20 of the right color image into a luminance component ($\hat{I}_Y^L$) 44 of the left color image by using the binocular disparity image ($\hat{D}^L$) 50. That is, the luminance component ($\hat{I}_Y^L$) 44 of the left color image is estimated from the luminance (Y-Channel) component ($I_Y^R$) 20 of the right color image. As described, the neural network 300 uses a bilinear interpolation sampler on the decoder to make it perfectly differentiable, so as to perform a pixel-wise translation of the luminance component ($\hat{I}_Y^L$) 44 of the left color image from the luminance (Y-Channel) component ($I_Y^R$) 20 of the right color image by use of the binocular disparity image ($\hat{D}^L$) 50.

The training apparatus 300 combines the chromaticity image ($\hat{I}_{cb}^L, \hat{I}_{cr}^L$) 42 of the left color image and the luminance component ($\hat{I}_Y^L$) 44 of the left color image to estimate the left color image ($\hat{I}_{clr}^L$) 40.

A depth estimating method of the depth image outputting apparatus 400 is as follows.

Referring to FIG. 3 (b), the depth image outputting apparatus 400 receives a thermal image ($I_T^{input}$) 70 photographed by the thermal camera. The thermal image ($I_T^{input}$) 70 will be referred to as an input thermal image to distinguish from the training thermal image.

The depth image outputting apparatus 400 inputs the input thermal image ($I_T^{input}$) 70 to the neural network 200 to estimate a binocular disparity image ($\hat{D}^{input}$) 80. The depth image outputting apparatus 400 transforms the binocular disparity image ($\hat{D}^{input}$) 80 into a depth image (distance image) ($\hat{d}$) 90. The depth image ($\hat{d}$) 90 may be obtained through Equation 2. In Equation 2, f is a focal distance, and B is a baseline distance.

$$\hat{d} = \frac{f \times B}{\hat{D}^{input}} \qquad \text{(Equation 2)}$$

As described, the thermal image and aligned the color image are used the neural network training, and only single thermal image is used to estimate the actual depth. Therefore, the technique for estimating depth information with a color image is useless at night, but the depth estimating apparatus 100 according to the present disclosure has an advantage of estimating the depth with the single thermal image irrespective of day or night.

Figure 4:
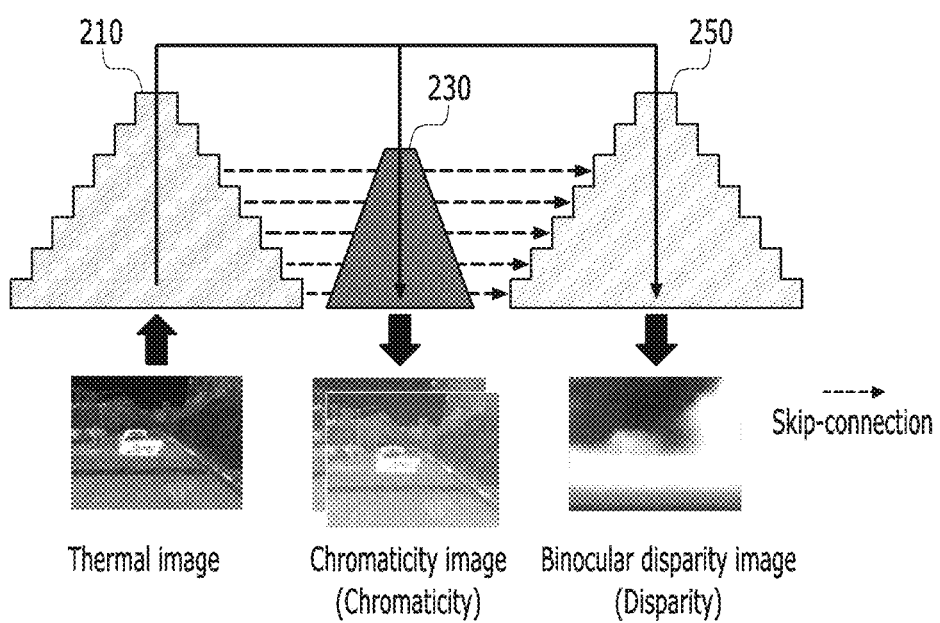
FIG. 4 shows a schematic structure of a neural network according to an exemplary embodiment of the present disclosure.
Figure 5:
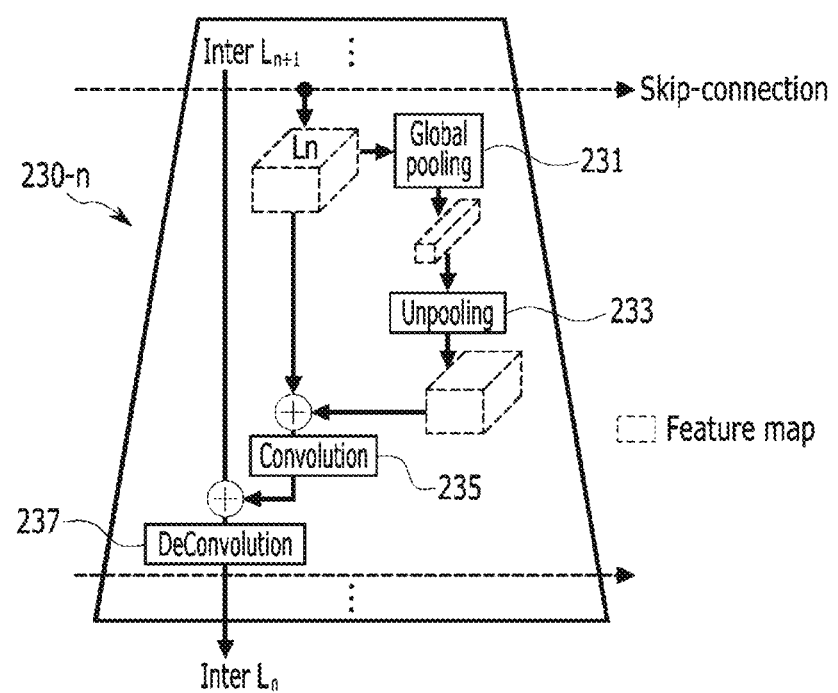
FIG. 5 shows a schematic architecture of an interleaver of a neural network according to an exemplary embodiment of the present disclosure.
Figure 6:
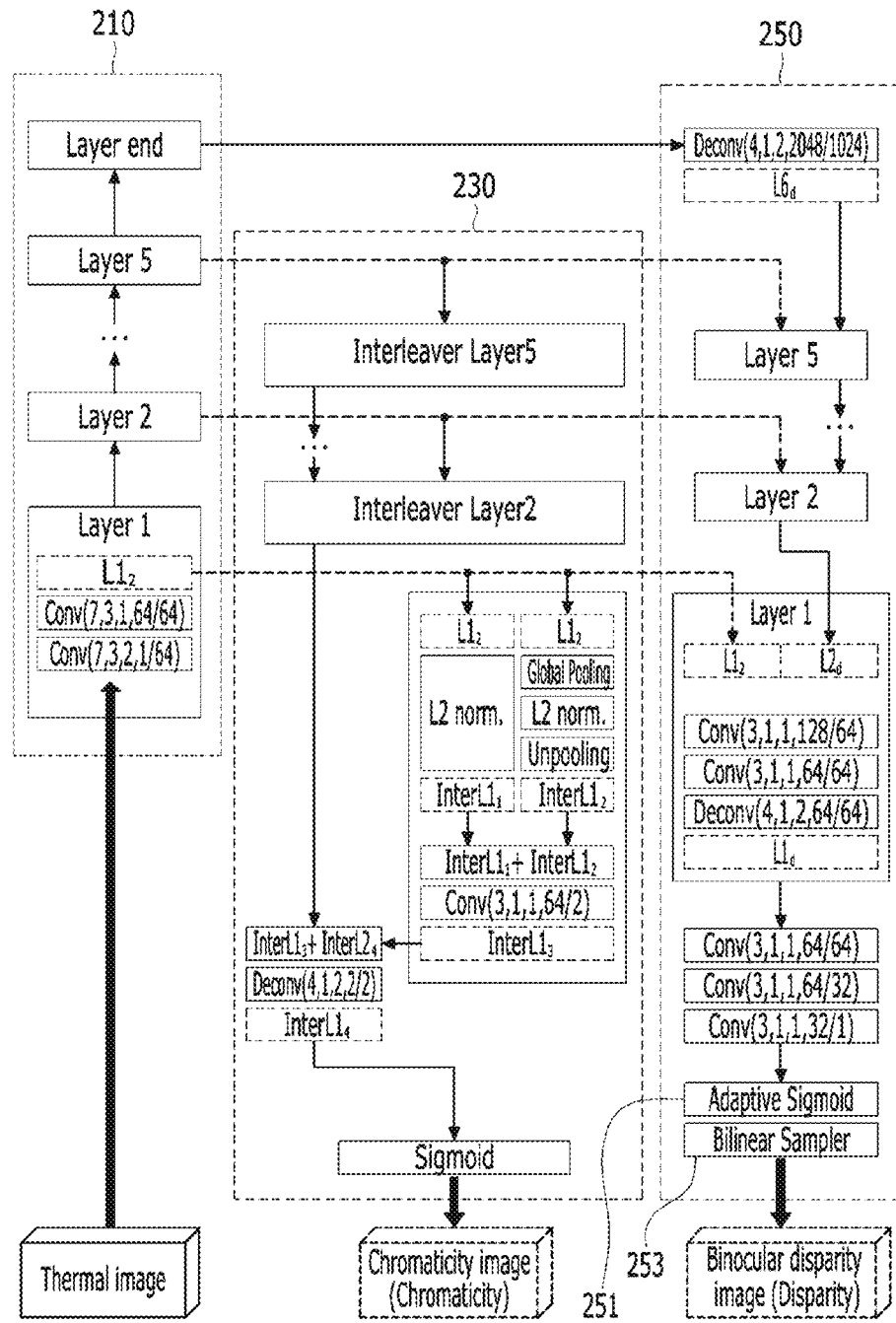
FIG. 6 shows a detailed architecture of a neural network according to an exemplary embodiment of the present disclosure.

FIG. 4 shows the schematic structure of a neural network according to an exemplary embodiment of the present disclosure, FIG. 5 shows a schematic architecture of an interleaver of a neural network according to an exemplary embodiment of the present disclosure, and FIG. 6 shows a detailed architecture of a neural network according to an exemplary embodiment of the present disclosure.

Referring to FIG. 4, the neural network 200 includes an encoder 210 for encoding a feature of an input image, an interleaver 230 for receiving encoded information and intermediate information of the encoder and outputting a chromaticity image (Chromaticity), and a decoder 250 for receiving encoded information and intermediate information of the encoder and outputting a binocular disparity image (Disparity). In addition, the intermediate information of the encoder received by the decoder 250 may be transformed when passing through the interleaver 230.

The encoder 210 is configured with a plurality of convolution layers hierarchically connected to each other, and receives a thermal image to encode the feature of the thermal image. The thermal image is the training thermal image ($I_T^L$) 10 of FIG. 3 or the thermal image ($I_T^{input}$) 70 for depth estimation.

The decoder 250 is configured with a plurality of deconvolution layers hierarchically connected to each other, and receives information encoded by the encoder 210. Further, the decoder 250 is skip-connected to the intermediate layer of the encoder 210, and receives intermediate information of the encoder through the skip connection so as to improve details of estimated depth information.

The interleaver 230 is newly formed structure to generate a chromaticity image (Chromaticity) used to estimate accurate depth information. The interleaver 230 is configured with a plurality of interleaving layers hierarchically connected to each other. The interleaver 230 receives encoded information and intermediate information from the encoder 210, and outputs a chromaticity image (Chromaticity). The chromaticity image is used to estimate the left color image ($\hat{I}_{clr}^L$) having a minimized difference from the photographed left color image ($I_{clr}^L$) in the neural network training step.

The intermediate information of the encoder 210 is transmitted to the decoder 250 through the interleaver 230. In another way, the interleaver 230 may transform the intermediate information of the encoder 210 and may transmit the same to a corresponding layer of the decoder 250.

Particularly, respective interleaving layers of the interleaver 230 add global context information to an encoding value of the encoder 210 through a configuration such as global pooling or un-pooling, and generate a chromaticity image. The chromaticity image produced by the interleaver 230 influences the weight for optimizing the encoder or updating of a gradient of the weight through back-propagation. As the interleaver 230 influences optimization of parameters of the neural network 200, it supports so that the decoder 250 may produce a high-quality binocular disparity image (Disparity).

Referring to FIG. 5, the interleaver 230 is in the middle for connecting the layer of the encoder 210 and the layer of the decoder 250, and the interleaving layers are configured through a hierarchical connection. The architecture of the interleaving layer is variable according to design.

For example, an interleaving layer 230-$n$ of the interleaver 230 corresponding to an n-th layer of the encoder 210 may include a global pooler 231, an un-pooler (Un-pooling) 233, a convolution unit 235, and a deconvolution unit (DeConvolution) 237.

The global pooler 231 performs global pooling for reducing a size [size of a feature map] of intermediate encoding information ($L_n$) transmitted through a skip connection from the n-th layer of the encoder 210. The un-pooler 233 performs un-pooling for increasing the size of the encoding information of which the size is reduced by the global pooler 231. The convolution unit 235 produces fine details on the chromaticity by convolving intermediate encoding information ($L_n$) and encoding information output by the un-pooler 233. The deconvolution unit 237 gradually restores the original size by convolving the added value of encoding information (inter $L_{n+1}$) output by the interleaving layer block (230_$n$+1) and fine details output by the convolution unit 235. The value (inter $L_n$) output by the deconvolution unit 237 is transmitted to the next interleaving layer block (230_$n$−1).

Referring to FIG. 6, the detailed architecture of the neural network 200 may be designed in various ways so as to output a chromaticity image and a binocular disparity image from the thermal image. According to the size of the input thermal image, the layers included in the encoder 210, the interleaver 230, and the decoder 250, and functional blocks of the respective layers, may be increased or reduced. Values of a parenthesis of the convolution and deconvolution blocks are convolution and deconvolution parameters, they represent a kernel size, a pad, a stride, and a number of in/out channels, and the parameters are changeable. For example, when a 448×576 sized thermal image is input, the neural network 200 may be configured with 29 convolution blocks, five global poolers and un-poolers, and eleven deconvolution blocks, and repeated architectures or portions that may be designed are omitted in FIG. 6.

The encoder 210 transmits thermal image encoded information to the decoder 250 through a plurality of convolution layers, and transmits intermediate information output by the respective layers to the interleaver 230 and the decoder 250 through a skip connection.

The interleaver 230 of FIG. 6 exemplifies a detailed design of an interleaving layer block of FIG. 5, it includes a global pooler and an un-pooler for each layer, and it finally outputs a chromaticity image through an activation function. A sigmoidal function will be exemplified as the activation function, but is not limited thereto.

The decoder 250 is configured with a plurality of deconvolution layers, it receives encoded information from the encoder 210 and intermediate information output by the intermediate layer of the encoder 210, and deconvolves the same to output decoded information.

In addition, the decoder 250 uses a bilinear interpolation sampler 253 so as to make the neural network 300 for a single image based depth estimating as a fully differentiable network. A pixel-wise translation is allowable through the bilinear interpolation sampler 253.

However, the bilinear interpolation sampler 253 may make the neural network training unstable as the binocular disparity map value increases. And regarding the unsupervised learning method without Ground truth, a fixed sigmoidal activation function may not control a maximum value of the binocular disparity map. Therefore, the decoder 250 uses an adaptive scaled sigmoid activation function module 251 for gradually increasing a maximum value of the sigmoidal activation function as expressed in Equation 3.

$$S_{ass}(x) = \frac{\beta}{1+e^x}, \begin{cases} \beta = \beta_v & \text{epoch} = 1 \\ \beta = \beta + \alpha, & \text{otherwise} \end{cases} \quad \text{(Equation 3)}$$

Figure 7:
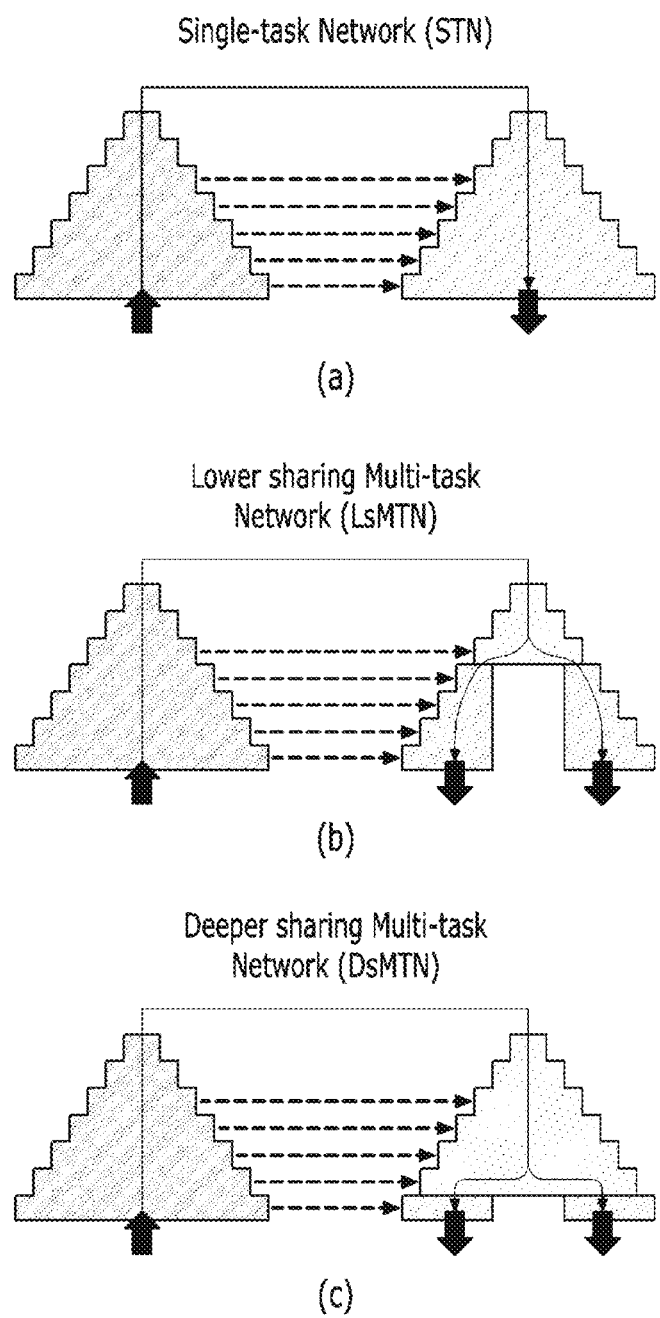
FIG. 7 shows an example of a neural network in comparison to a neural network according to an exemplary embodiment of the present disclosure.

FIG. 7 shows an example of a neural network in comparison to a neural network according to an exemplary embodiment of the present disclosure.

Referring to FIG. 7, the single task network (STN) as shown by (a) does not learn the chromaticity image estimation. A lower sharing multi-task network (LsMTN) like (b) or a deeper sharing multi-task network (DsMTN) like (c) may process a multi-task (a binocular disparity map estimation, a depth image estimation and a chromaticity image estimating), but it is very difficult to explicitly control the balance between two tasks so as to achieve excellent performance. On the contrary, the neural network 200 according to the present disclosure may naturally solve a balance between a chromaticity image estimating task (slave task) and a binocular disparity map estimate task (master task) by using the interleaver 230.

Figure 8:
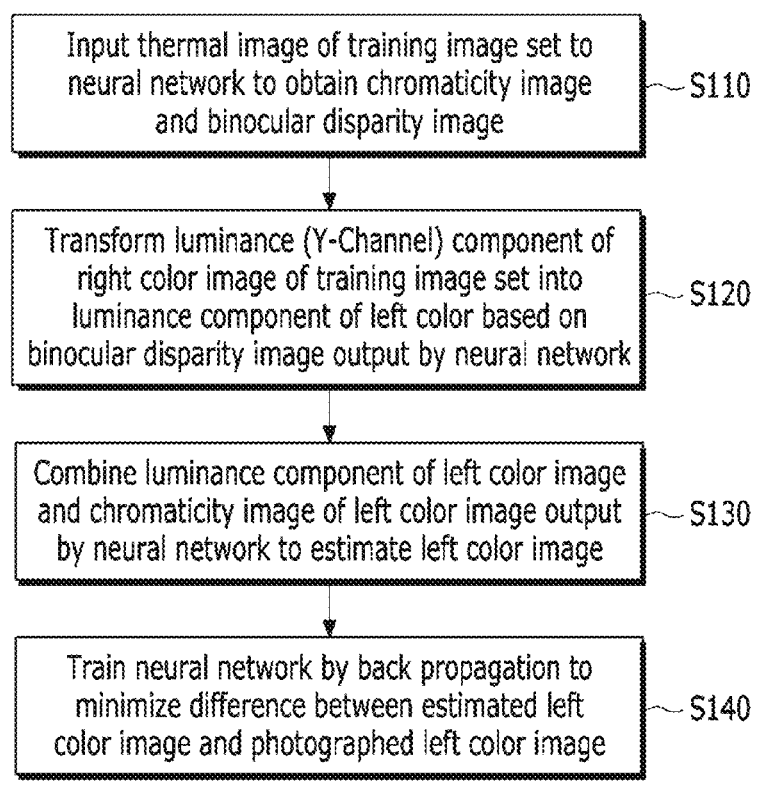
FIG. 8 shows a flowchart of a neural network training method of a depth estimating apparatus according to an exemplary embodiment of the present disclosure.

FIG. 8 shows a flowchart of a neural network training method of a depth estimating apparatus according to an exemplary embodiment of the present disclosure.

Referring to FIG. 8, the depth estimating apparatus 100 trains the neural network 200 in an unsupervised manner by using training image set. The training image set includes the thermal image ($I_T^L$), the left color image ($I_{clr}^L$) used as a reference image aligned with the thermal image ($I_T^L$), and luminance (Y-Channel) components ($I_Y^R$) used for generating the estimated left color image ($\hat{I}_{clr}^L$). The neural network 200 includes function blocks, such as a convolution unit, a deconvolution unit, a global pooler, or an un-pooler, for receiving a thermal image and outputting a chromaticity image (Chromaticity) and a binocular disparity image (Disparity).

The depth estimating apparatus 100 inputs the thermal image ($I_T^L$) of the training image set to the neural network 200 to obtain a chromaticity image ($\hat{I}_{cb}^L, \hat{I}_{cr}^L$) and a binocular disparity image ($\hat{D}^L$) (S110).

The depth estimating apparatus 100 transforms the luminance (Y-Channel) component ($I_Y^R$) of the right color image of the training image set into a luminance component ($\hat{1}$) of the estimated left color image, based on the binocular disparity image ($\hat{D}^L$) output by the neural network 200 (S120).

The depth estimating apparatus 100 estimates the left color image ($\hat{I}_{clr}^L$) by combining the estimated luminance component ($\hat{I}_Y^L$) of the left color image and the estimated chromaticity image ($\hat{I}_{cb}^L, \hat{I}_{cr}^L$) of the left color image output by the neural network 200 (S130).

The depth estimating apparatus 100 performs back-propagation for minimizing the difference ($\hat{I}_{clr}^L - I_{clr}^L$) between the estimated left color image ($\hat{I}_{clr}^L$) and the photographed left color image ($I_{clr}^L$) to thus train the neural network 200 (S140).

Figure 9:
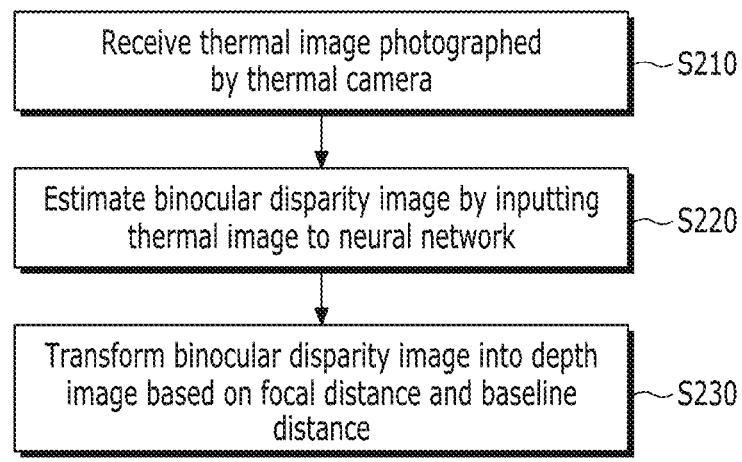
FIG. 9 shows a flowchart of a depth estimating method according to an exemplary embodiment of the present disclosure.

FIG. 9 shows a flowchart of a depth estimating method according to an exemplary embodiment of the present disclosure.

Referring to FIG. 9, the depth estimating apparatus 100 receives the thermal image ($I_T^{input}$) photographed by a thermal camera 500 (S210).

The depth estimating apparatus 100 estimates the binocular disparity image ($\hat{D}^{input}$) by inputting the input thermal image to the neural network 200 (S220).

The depth estimating apparatus 100 transforms the binocular disparity image ($\hat{D}^{input}$) into a depth image ($\hat{d}$) based on the focal distance and the baseline distance (S230).

Figure 10:
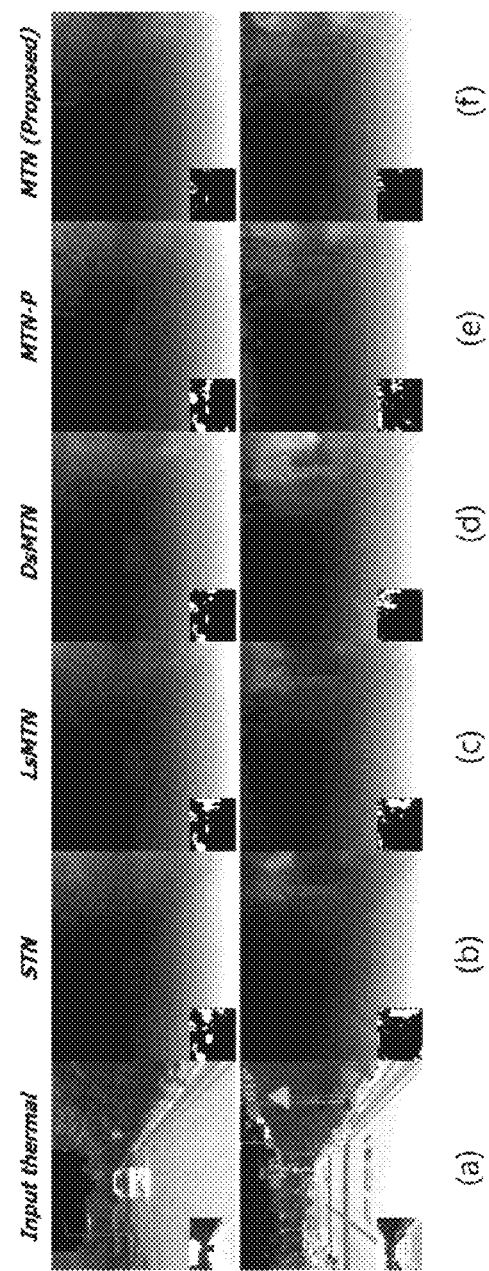
FIG. 10 shows a comparison of results of depth information estimated from a thermal image measured during the day according to an exemplary embodiment of the present disclosure of another technique.
Figure 11:
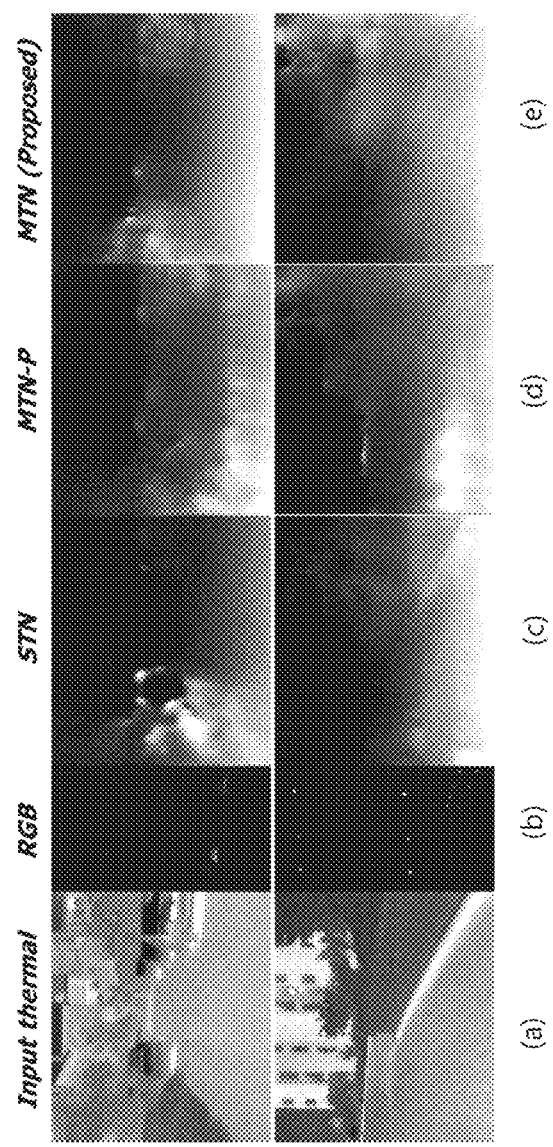
FIG. 11 shows a comparison of results of depth information estimated from a thermal image measured during the night according to an exemplary embodiment of the present disclosure of another technique.

FIG. 10 shows a comparison of results of depth information estimated from a thermal image measured during the day according to an exemplary embodiment of the present disclosure of another technique, and FIG. 11 shows a comparison of results of depth information estimated from a thermal image measured during the night according to an exemplary embodiment of the present disclosure of another technique.

Referring to FIG. 10, (a) is a thermal image photographed during the day, and the image below the left is the color image aligned with the thermal image. (b) is depth information estimated on the single task network (STN) on which a chromaticity image estimation is not trained, (c) is depth information estimated on the lower sharing multi-task network (LsMTN), and (d) is depth information estimated on the deeper sharing multi-task network (DsMTN). (e) is depth information estimated from the trained neural network 200 without using a training image through photometric correction, and (f) is depth information estimated from the neural network 200 trained by using a training image through photometric correction. A small image below the left of (b), (c), (d), (e), and (f) is an error map, and it is found that an error of the depth information (f) estimated from the neural network 200 trained by using a training image through photometric correction is the smallest.

Referring to FIG. 11, (a) is a thermal image photographed during the night. (b) is a color image aligned with the thermal image. (c) is depth information estimated from the single task network (STN) on which chromaticity image estimation is not trained, (d) is depth information estimated from the neural network 200 trained without using a training image through photometric correction, and (e) is depth information estimated from the neural network 200 trained by using a training image through photometric correction. It is found that the accuracy of depth information (e) estimated from the neural network 200 trained by using a training image through photometric correction is higher than in other methods.

As described, according to the exemplary embodiment of the present disclosure, the depth (distance) may be estimated through the thermal camera and the trained neural network, instead of the hardware sensor such as a plurality of radar or lidar sensors that are expensive and are hard to install, in the environments in which lighting is changed or at night in which the amount of light is insufficient. According to the exemplary embodiment of the present disclosure, the depth estimation from a single thermal image may consecutively improve accuracy as the neural network is continuously trained. According to an exemplary embodiment of the present disclosure, the thermal image based depth estimating method may be substituted for the present depth estimating hardware sensor. Particularly, according to an exemplary embodiment of the present disclosure, an autonomous vehicle or a disaster relief robot may be allowed to robustly recognize objects and environments, and performance thereof may be improved through software without replacing parts.

The above-described embodiments can be realized through a program for realizing functions corresponding to the configuration of the embodiments or a recording medium for recording the program, in addition to through the above-described apparatus and/or method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A depth estimating apparatus operated by at least one processor, comprising:
    a database which stores a photographed first color image, a training thermal image geometrically aligned with the first color image, and a second color image simultaneously photographed with the first color image as a training image set; and
    a training apparatus which trains a neural network in an unsupervised manner to output a chromaticity image and a binocular disparity image from the training thermal image,
    wherein the training apparatus generates an estimated first color image from the second color image, the chromaticity image, and the binocular disparity image, and trains the neural network to minimize a difference between the estimated first color image and the photographed first color image.

2. The depth estimating apparatus of claim 1, wherein the training apparatus estimates a luminance component of the estimated first color image from a luminance component of the second color image based on the binocular disparity image, and combines the estimated luminance component and the chromaticity image to generate the estimated first color image.

3. The depth estimating apparatus of claim 1, wherein the database further stores a plurality of thermal images obtained by performing a photometric correction on the training thermal image, and
    the training apparatus trains the neural network by using the photometrically corrected thermal images.

4. The depth estimating apparatus of claim 1, further comprising
    an output apparatus which receives a single thermal image for estimating a depth, sends the single thermal image to the neural network to obtain a binocular disparity image for depth estimation, and generates a depth image based on the binocular disparity image for depth estimation.

5. The depth estimating apparatus of claim 1, wherein the neural network includes:
    an encoder for encoding features of an input thermal image;
    an interleaver for receiving encoded information and intermediate information of the encoder from the encoder, and outputting the chromaticity image; and
    a decoder for receiving encoded information and intermediate information of the encoder from the encoder and outputting the binocular disparity image.

6. A depth estimating apparatus operated by at least one processor, comprising:
- a trained neural network to output a binocular disparity image from a thermal image; and
- an output apparatus which receives a single thermal image for estimating a depth, sends the single thermal image to the neural network to obtain a binocular disparity image for depth estimation, and generates a depth image based on the binocular disparity image for depth estimation.

7. The depth estimating apparatus of claim 6, wherein the neural network includes:
- an encoder for encoding features of an input thermal image;
- an interleaver for receiving encoded information and intermediate information of the encoder from the encoder, and outputting a chromaticity image; and
- a decoder for receiving encoded information and intermediate information of the encoder from the encoder, and outputting a binocular disparity image relating to the input image.

8. The depth estimating apparatus of claim 7, further comprising
- a training apparatus which trains the neural network in an unsupervised manner by using a training image set including a photographed first color image, a training thermal image geometrically aligned with the first color image, and a second color image simultaneously photographed with the first color image,
- wherein the training apparatus inputs the training thermal image to the neural network to obtain a training chromaticity image and a training binocular disparity image, and trains the neural network to generate an estimated first color image from the second color image, the chromaticity image, and the binocular disparity image, and minimize a difference between the estimated first color image and the photographed first color image.

9. The depth estimating apparatus of claim 7, wherein the decoder includes a bilinear interpolation sampler to output a binocular disparity image to an output end.

10. The depth estimating apparatus of claim 9, wherein the decoder further includes an adaptive activation function module for gradually increasing a maximum value of an activation function so as to stably train the bilinear interpolation sampler.

11. The depth estimating apparatus of claim 6, wherein the output apparatus receives the single thermal image from a thermal camera mounted on a mobility object.

12. A neural network operated by at least one processor, comprising:
- an encoder which receives a thermal image, outputs feature information of the thermal image encoded through a plurality of convolution layers hierarchically connected to each other, and outputs intermediate information encoded in respective convolution layers;
- a decoder which includes a plurality of deconvolution layers hierarchically connected to each other, receives the feature information of the thermal image output from the encoder and the intermediate information output from the respective convolution layers of the encoder, and outputs a binocular disparity image relating to the thermal image; and
- an interleaver which includes a plurality of interleaving layers hierarchically connected to each other, receives the feature information of the thermal image output from the encoder and the intermediate information output from the respective convolution layers of the encoder, and outputs a chromaticity image relating to the thermal image.

13. The neural network of claim 12, wherein
the respective interleaving layers generate global context information by global pooling and un-pooling the intermediate information output from the corresponding convolution layer of the encoder, add the generated global context information to previous information transmitted from an upper interleaving layer to generate new information, and transmit new information deconvolved to a lower interleaving layer, and
the previous information is generated by adding global context information generated in the upper interleaving layer and information encoded in the encoder.

14. The neural network of claim 12, wherein
the decoder further includes a bilinear interpolation sampler which outputs the binocular disparity image from decoded information output in a lowest deconvolution layer, by bilinear interpolation sampling.

15. The neural network of claim 14, wherein
the decoder further includes an adaptive activation function module for gradually increasing a maximum value of an activation function so as to stably train the bilinear interpolation sampler.

16. The neural network of claim 12, wherein
the neural network learns to minimize a difference between an estimated first color image and a photographed first color image,
the estimated first color image is obtained from the second color image, the binocular disparity image, and the chromaticity image,
the photographed first color image is geometrically aligned with the thermal image, and the photographed first color image and the second color image are simultaneously photographed.

17. An operating method of a depth estimating apparatus operable by at least one processor, comprising:
- obtaining a chromaticity image and a binocular disparity image by inputting a training thermal image to a neural network;
- estimating a second color image from a first color image by using the chromaticity image and the binocular disparity image; and
- training the neural network to minimize the difference between the estimated second color image and the photographed second color image,
- wherein the training thermal image and the photographed second color image are geometrically aligned, and
- the first color image and the photographed second color image are stereo images that are simultaneously photographed.

18. The operating method of claim 17, wherein
the estimating the second color image includes:
- estimating a luminance component of the estimated second color image from a luminance component of the first color image by using the binocular disparity image; and
- generating the estimated the second color image by combining the estimated luminance component and the chromaticity image.

19. The operating method of claim 17, wherein
the training thermal image is generated by a photometric correction on a photographed specific thermal image.

20. The operating method of claim 17, further comprising:
receiving a single thermal image for depth estimation;
transmitting the single thermal image to the neural network and obtaining a binocular disparity image for depth estimation; and
generating a depth image based on the binocular disparity image for depth estimation.

\* \* \* \* \*